United States Patent
Magee

(10) Patent No.: US 7,020,222 B2
(45) Date of Patent: Mar. 28, 2006

(54) EFFICIENT METHOD AND SYSTEM FOR OFFSET PHASOR DETERMINATION

(75) Inventor: David Patrick Magee, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 795 days.

(21) Appl. No.: 10/002,318

(22) Filed: Oct. 24, 2001

(65) Prior Publication Data

US 2003/0086508 A1 May 8, 2003

(51) Int. Cl.
*H03D 1/00* (2006.01)
*H04L 27/06* (2006.01)

(52) U.S. Cl. .................... 375/340; 375/345
(58) Field of Classification Search ............... 375/224, 375/226, 344, 345, 371, 375
See application file for complete search history.

(56) References Cited

U.S. PATENT DOCUMENTS

| | | | | |
|---|---|---|---|---|
| 4,447,910 A | * | 5/1984 | Smith et al. ................ 375/346 |
| 5,127,051 A | | 6/1992 | Chan et al. ................... 380/49 |
| 5,550,869 A | | 8/1996 | Gurantz et al. ............. 375/340 |
| 5,751,776 A | * | 5/1998 | Shiino et al. ............... 375/371 |
| 6,005,840 A | | 12/1999 | Awater et al. ............. 370/206 |
| 6,091,932 A | | 7/2000 | Langlais ..................... 455/5.1 |
| 6,185,257 B1 | | 2/2001 | Moulsley .................... 375/260 |
| 6,192,026 B1 | | 2/2001 | Pollack et al. ............. 370/203 |
| 6,198,782 B1 | | 3/2001 | De Courville et al. ...... 375/341 |
| 6,226,337 B1 | | 5/2001 | Klank et al. ................ 375/367 |
| 6,263,029 B1 | | 7/2001 | Alard et al. ................ 375/340 |
| 6,347,126 B1 | * | 2/2002 | Nagayasu et al. .......... 375/344 |
| 6,628,926 B1 | * | 9/2003 | van de Beek et al. ....... 455/75 |
| 2002/0045433 A1 | * | 4/2002 | Vihriala ...................... 455/313 |

OTHER PUBLICATIONS

Schwarzbacher et al., "Optimisation of Trigonometric Functions for Low Power CMOS Implementations", Reprint of Irish Signals and Systems Conference 1999, Galway, Ireland, Jul. 1999, pp. 201-206.*

* cited by examiner

*Primary Examiner*—Robert Pascal
*Assistant Examiner*—Krista Flanagan
(74) *Attorney, Agent, or Firm*—Abdul Zindani; W. James Brady, III; Frederick J. Telecky, Jr.

(57) ABSTRACT

Systems and methods for determining offset phasors are disclosed. An offset vector is computed from a current channel impulse response and a previous channel impulse response. A first vector and a second vector are simultaneously and iteratively rotated in opposite directions to determine an offset phasor. A first vector of the pair of vectors is initialized with a constant value for its x coordinate and a zero for its y coordinate. A second vector of the pair of vectors is initialized with the x and y coordinates of the offset vector. The vectors are rotated in opposite directions using shift operations for a specific number of iterations. After the final rotation, the y coordinate of the second vector has become zero and the x and y coordinates of the first vector correspond to the sine and cosine of the angle formed by the offset vector. The cosine and sine terms form the real and imaginary parts of the offset phasor.

26 Claims, 4 Drawing Sheets

EFFICIENT METHOD AND SYSTEM FOR OFFSET PHASOR DETERMINATION

TECHNICAL FIELD

The present invention generally relates to communication systems and signal processing and in particular to a method and system for offset phasor determination.

BACKGROUND OF THE INVENTION

Various types of distortion and noise are introduced into data signals that are transmitted over a communication path. The distortion and noise is due to interference with other signals within the same frequency range and path and also due to multipath dispersions. Multipath dispersions occur when signals propagate along different or reflected paths through a transmission medium to a receiving destination. Therefore, the signal received is not the same as the original signal transmitted, and when the signal is demodulated and decoded, errors in the original transmitted data often result.

The effect of the interference is to alter or distort the signal spectrum when compared to the spectrum as transmitted. The effects are different at different frequencies across the signaling band. At some frequencies, multipath signals add constructively to result in an increased signal amplitude, while at other frequencies the multipath signals add destructively (out of phase) to cancel or partially cancel the signal, resulting in reduced signal amplitude. Collectively, the wireless environment can be thought of as a channel characterized with frequency selective fading and delay distortion. The effects of the wireless channel over which they were sent have perturbed the recovered tones.

Mathematically, the wireless channel has a transfer function with a corresponding frequency response. Tones have been modified in amplitude and phase by the wireless transfer function. The channel distortions introduce errors in data decoding. Therefore, it is necessary to estimate the amplitude and phase of the transmission channel at each frequency of interest and compensate for the channel in the data decoding process. The estimation of the channel transmission amplitude and phase is termed channel estimation. Therefore, a channel estimation procedure is used to estimate the amplitude and phase of the channel at each tone.

The channel estimation procedure computes a complex valued channel response at each tone location. The channel response is adjusted as necessary to account for signal interference. Generally, the channel response can be adjusted for phase offsets or phase shifts and amplitude changes. The channel responses are collectively combined into a channel frequency response, which is often referred to as a channel estimate.

In a noise free, ideal environment, the phase offset will be zero. However, in the real world, there will be some phase shift or phase offset. However, determining a phase offset is, typically, a computationally expensive process. The phase shift computation generally requires computing and evaluating trigonometric functions. Thus, the computation requires a large number of processor cycles. Even with today's DSPs, real time computation of the large number of calculations requires the use of a cost prohibitive processor or DSP.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides for a system and method for computing an offset phasor utilizing one or more channel impulse responses. An offset vector is computed using the current and/or previous channel impulse responses. A first and a second vector are simultaneously and iteratively rotated in opposite directions in order to determine an offset phasor. The first vector of the pair of vectors is initialized with a constant value for its x coordinate and a zero value for its y coordinate. The second vector of the pair of vectors is initialized with the x and y coordinates of the offset vector. The vectors are rotated in opposite directions using shift operations for a specific number of iterations. After a final rotation, the y coordinate of the second vector has become zero and the x and y coordinates of the first vector correspond to the sine and cosine of the angle formed by the offset vector. The cosine and sine terms form the real and imaginary parts of the offset phasor.

In one aspect of the invention, an offset phasor determiner is utilized in a receiver to determine an offset phasor (e.g., the sine and cosine of a phase offset). An IFFT (Inverse Fast Fourier Transform) is performed on a channel frequency response to obtain a channel impulse response. The channel impulse response is compared to a previous channel impulse response or an average channel impulse response to form a phase offset vector. The sine and cosine of the phase offset are computed from the offset vector without knowing the angle formed by the offset vector (i.e., the phase offset). The channel impulse response is corrected by the phase offset to obtain a phase corrected channel impulse response. A channel estimate is formed at least partly from the phase corrected channel impulse response.

The following description and the annexed drawings set forth in detail certain illustrative aspects of the invention. These aspects are indicative, however, of but a few ways in which the principles of the invention may be employed. Other advantages and novel features of the invention will become apparent from the following detailed description of the invention when considered in conjunction with the drawings.

DETAILED DESCRIPTION OF THE INVENTION

The present invention will be described with reference to a system and method for providing a phase offset correction of a channel (e.g., wireless) with reduced computations. An offset vector is computed using a current and/or previous channel impulse responses. A pair of vectors is concurrently and iteratively rotated in opposite directions in order to determine an offset phasor. A first vector of the pair of vectors is initialized with a constant value for its x coordinate and a zero value for its y coordinate. A second vector of the pair of vectors is initialized with the x and y coordinates of the offset vector. The first and second vectors are rotated in opposite directions using shift operations for a specific number of iterations.

After the final rotation, the y coordinate of the second vector has moved to about zero and the x and y coordinates of the first vector correspond to the sine and cosine of the phase offset. The sine and cosine of the phase offset, an offset phasor, are computed from the phase offset vector without knowing the angle formed by the offset vector (i.e., the phase offset) and by only using shift operations. Thus, the sine and cosine of the phase offset are computed with a reduced number of computations compared to conventional methods of computing the sine and cosine of an angle. The reduced computations allow for employment of signal processing devices of reduced complexities to be utilized in the decoding process of transmission signals.

Although the present invention is described with respect to a receiver system, it is appreciated that the present invention applies to performing trigonometric functions and/or equivalents thereof in other systems. The present invention is particularly applicable in any system where the coordinates of a vector are known and the cosine and sine of the angle formed by the vector are desired.

Figure 1:
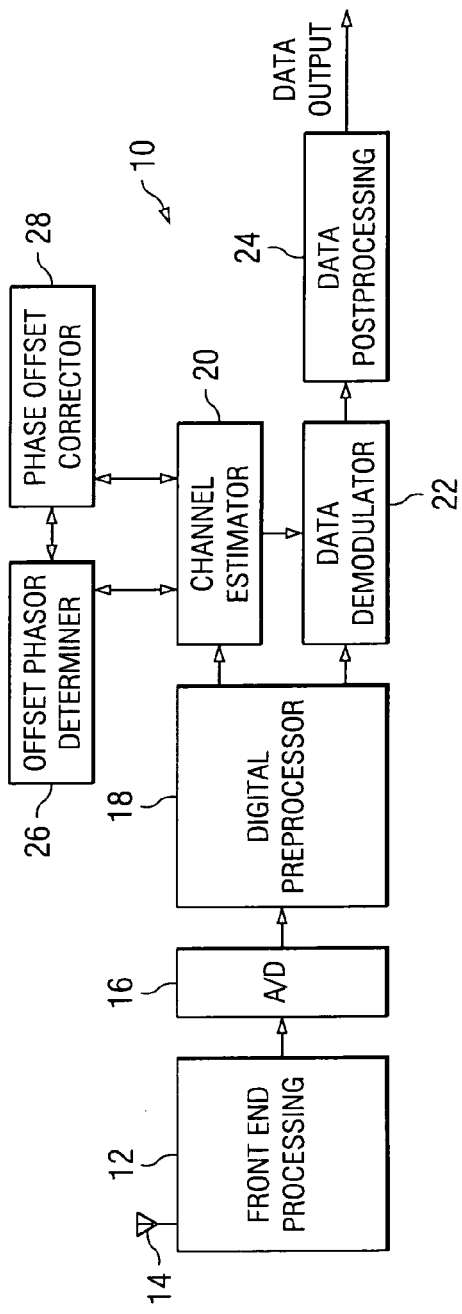
FIG. 1 illustrates a block schematic diagram of a wireless receiver system in accordance with one aspect of the present invention.

FIG. 1 illustrates a schematic block diagram of a wireless receiver system 10 in accordance with one aspect of the present invention. A data signal or burst is received by an antenna 14, which captures the data signal and transfers the data signal to a front end processing component 12. The front end processing component 12 amplifies the data signal, converts the data signal to an intermediate frequency (IF) and filters the data signal to eliminate signals that are outside of the desired frequency band. It is to be appreciated that many variations in receiver front end processing exist. For example, some receiver front end processing includes utilizing multiple IF frequencies and successive frequency conversions. Additional, some receivers provide direct radio frequency (RF) sampling without IF stages. The front end processing component 12 feeds one or more analog-to-digital (A/D) converters 16 that sample the data signal and provide a digitized signal output. The front end processing component 12 can provide automatic gain control (AGC), as is conventional, to maintain the signal strength relatively to the one or more A/D converters 16.

The digitized signal output of the one or more A/D converters 16 is then provided to a digital preprocessor 18. The digital preprocessor 18 provides additional filtering of the digitized signals and reduces or decimates the sample of the digitized signal. The digital preprocessor 18 then performs a FFT on the digitized signal. The FFT on the digitized signal converts the signal from the time domain to the frequency domain so that the frequencies or tones carrying the data can be provided. The exact implementation of the digital preprocessor 18 can vary depending on the particular receiver architecture being employed to provide the frequencies or tones carrying the data. The frequencies and tones can then be demodulated. The digital preprocessor 18 provides the processed frequency domain signal to a channel estimator 20.

The channel estimator 20 is present to provide the impulse response of the communication channel during each data burst. The channel estimator 20 extracts pilot tones (e.g., training tones) from the frequency domain signal and then performs an IFFT to get the channel impulse response for a data burst. These operations are repeated for each data burst received by the receiver 10. The channel estimator 20 can track channel impulse responses and compute an average impulse response in order to improve the accuracy of the channel impulse response estimate and to remove any sudden discontinuities in the response from burst to burst. Whether the channel estimator 20 provides an instantaneous channel impulse response or an average channel impulse response is immaterial to the operation of an offset phasor determiner 26. Therefore, the term channel impulse response will be used to refer to whichever response is provided by the channel estimator.

The offset phasor determiner 26 receives the channel impulse response from the channel estimator 20 and also stores the previous channel impulse response. The determiner computes an offset vector, whose angle represents the phase offset, from the channel impulse response and the previous channel impulse response. The sine and cosine of the phase offset correspond to the real and imaginary parts of the offset phasor, respectively. The offset phasor determiner 26 computes the sine and cosine of the phase offset using coordinate transformations without knowing the actual value of the phase offset. The phase offset corrector 28 receives the channel impulse response and the offset phasor and then corrects and/or adjusts the channel impulse response by the offset phasor to provide a phase corrected channel impulse response. The phase corrected channel impulse response may be stored as the previous channel impulse response in the offset phasor determiner 26 to be used for subsequent computations. It is appreciated that the phase offset corrector 28 and the offset phasor determiner 26 may be implemented as part of the channel estimator 20.

The channel estimator 20 receives the phase corrected channel impulse response from the phase offset corrector 28. The channel estimator 20 may provide additional corrections, based on known channel responses at the training tones, to the impulse response, such as amplitude and phase corrections. The channel estimator zero pads the channel impulse response and performs a FFT on the channel impulse response to provide a frequency domain response commonly referred to as the channel estimate.

The channel estimate is then provided to the data demodulator 22 for demodulation of digital data signal and other functions such as beamforming and slicing for constellation bit mapping. The demodulated data signal is then transmitted to a data postprocessing component 24 for further signal processing. The data postprocessing component 24 performs error correction utilizing the information provided by the data demodulator 24 in addition to providing block or packet formatting. The data postprocessing component 24 then output the data for decoding.

Figure 2:
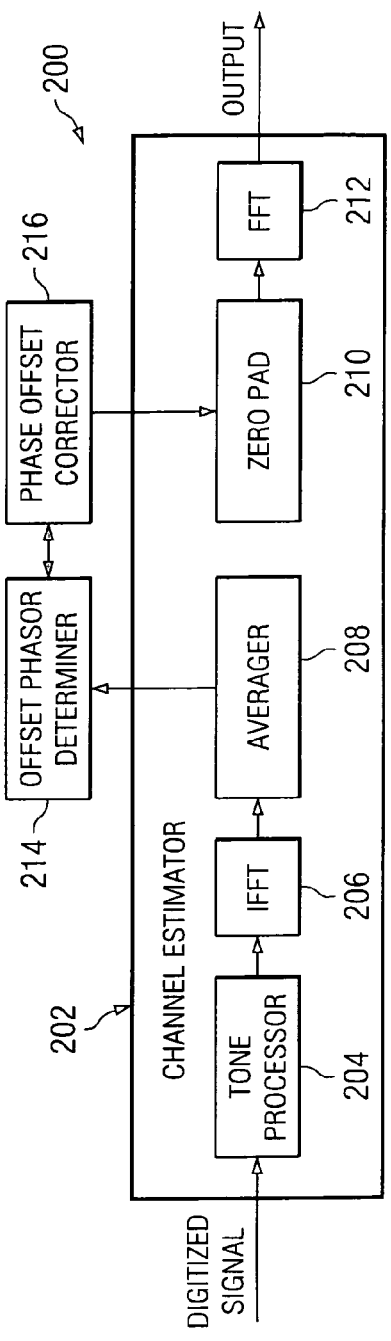
FIG. 2 illustrates a block diagram of a system having a channel estimator in accordance with one aspect of the present invention.

FIG. 2 is a block diagram of a system 200 according to one aspect of the invention. The system 200 includes a channel estimator 202, an offset phasor determiner 214 and a phase offset corrector 216. The system 200 can be used in a communication system. One way of reducing the number of computations is to decimate the channel estimation process in the frequency domain. However, this decimation increases the need for determining and correcting phase offsets. The system 200 permits decimation of the channel estimation process by correcting phase offsets.

The channel estimator 202 includes a tone processor 204, which is operative to receive a processed digital signal. The tone processor 204 extracts pilot tones (e.g., training tones) from the processed digital signal. The tone processor 204 may perform additional processing on the processed digital signal, such as phase demodulation and tone scaling. The signal is passed to an IFFT component 206, where the IFFT component 206 provides a channel impulse response by performing an IFFT computation on the extracted training tones. The averager 208 receives the channel impulse response for further processing.

The averager 208 provides the average channel impulse response using the current and previous channel impulse responses. The average channel impulse response will be the current channel impulse response if averaging is turned off. The offset phasor determiner 214 receives the average channel impulse response from the averager 208. The offset phasor determiner 214 computes an offset vector using the current and previous channel impulse responses. The offset vector represents the phase offset of the channel impulse response. The offset phasor determiner 214 computes the sine and cosine of the phase offset, which yields an offset phasor for correcting the channel impulse response. The phase offset corrector 216 receives the channel impulse response and the offset phasor and then corrects and/or adjusts the channel impulse response by the offset phasor to provide a phase corrected channel impulse response. The offset phasor determiner 214 receives the phase corrected channel impulse response and stores the phase corrected impulse response as a previous channel impulse response for subsequent computations.

The phase corrected channel impulse response is then provided back to the channel estimator 202. The channel estimator includes a zero pad component 210, which receives the phase corrected channel impulse response and pads it with zeros as necessary. The padded channel impulse response is received by the FFT 212, which provides a channel estimate as output. The channel estimate may be decimated such that a complete channel estimate is provided every N bursts, for example, by combining a plurality of partial channel estimates such that only one partial estimate is updated in a single burst.

Although the offset phasor determiner 214 and the phase offset corrector 216 are illustrated as separate from the channel estimator 202, it is appreciated that the offset phasor determiner 214 and the phase offset corrector 216 can be integrated into the channel estimator 202.

Figure 3:
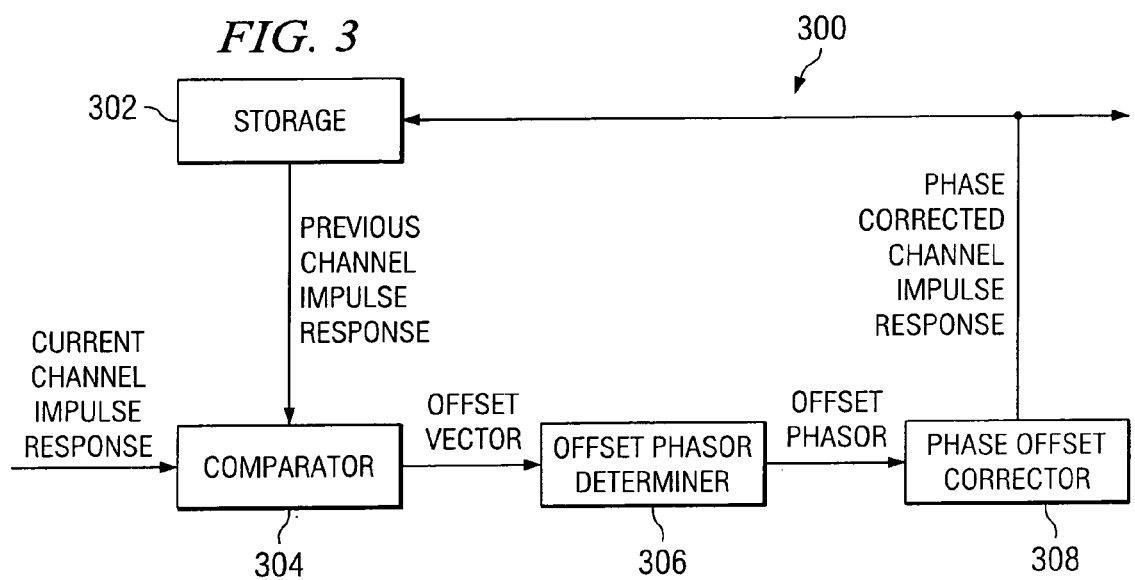
FIG. 3 illustrates a block diagram of an offset phasor determiner system in accordance with one aspect of the present invention.

FIG. 3 is a block diagram of a system 300 according to one aspect of the invention. The system 300 computes an offset phasor for the channel impulse response and corrects the channel impulse response with the offset phasor. A comparator 304 receives the current channel impulse response and the previous channel impulse response. The channel impulse response is typically received from a channel estimator or a component of a channel estimator. The previous channel impulse response is received from a storage component 302. The comparator 304 computes an offset vector using the current and previous channel impulse responses. The offset vector represents a phase offset of the current channel impulse response.

An impulse response or channel impulse response is typically represented as a complex valued vector of length N. Thus, an offset vector may be computed by multiplying the previous channel impulse response times a complex conjugate of the current channel impulse response. The offset vector represents a phase offset between the current channel impulse response and the previous channel impulse response.

The offset vector is received by an offset phasor determiner 306 from the comparator 304. The angle represented by the offset vector is called the phase offset. The offset phasor determiner 306 computes an offset phasor with a real component corresponding to the cosine of the phase offset and an imaginary component corresponding to the sine of the phase offset. The offset phasor determiner 306 computes the sine and cosine of the phase offset without first determining the angle represented by the offset vector. In one aspect of the invention, the offset phasor determiner 306 utilizes coordinate transformations to compute the real and imaginary components of the offset phasor.

The phase offset corrector 308 receives the first and second components (i.e., the sine and cosine of the phase offset) of the offset phasor and computes a corrected channel impulse response. The corrected channel impulse response is the channel impulse response modified or adjusted by the offset phasor. The storage component 302 receives the corrected channel impulse response and stores it as the previous channel impulse response for use in the next burst. The corrected channel impulse response is typically received by a channel estimator or a component of a channel estimator.

As stated above, the offset phasor determiner 306 can compute the sine and cosine of the phase offset represented by an offset vector using a coordinate transformation algorithm. The offset vector represents the phase shift between the current channel impulse response and the previous channel impulse response. The offset vector may be computed as a product of the previous channel impulse response and a complex conjugate of the current channel impulse response. It is appreciated that other aspects of the invention may compute the offset vector by comparing the current channel impulse response to an average channel impulse response or other channel impulse response.

The offset vector can be represented in a Cartesian coordinate system as z=(x,y), where x is the abscissa and y is the ordinate. The same vector z can be represented in a polar coordinate system as z=(R cos(θ), R sin(θ)), where R is the magnitude and θ is the angle. The angle of the offset vector is referred to as the phase offset. As computed, the offset vector has known x and y coordinates. However, the angle of the offset vector is not known. The angle of the offset vector may be computed, but such computations are computationally expensive. The sine and cosine of the offset vector are needed for the offset phasor. However, the cosine and sine functions cannot be computed if the angle of the vector is not known.

In vector calculus, the sine and cosine functions can be represented using two vectors that lie in a plane. From the definition of a cross product comes a relationship for the sine function, which is:

$$\sin(\theta) = \frac{|\vec{v}_1 \times \vec{v}_2|}{|\vec{v}_1||\vec{v}_2|} \qquad (1)$$

Further, from the definition of a dot product comes a relationship for the cosine function, which is:

$$\cos(\theta) = \frac{\vec{v}_1 \cdot \vec{v}_2}{|\vec{v}_1||\vec{v}_2|} \tag{2}$$

However, these equations are not conducive for real time implementation in a communication system because of the norm calculations and the divide operation.

One attempt to reduce the computational cost of performing trigonometric calculations is the COordinate Rotation DIgital Computer (CORDIC) algorithm by Jack Volder in 1959. See, Volder, J., "The CORDIC Trigonometric Computing Technique," IRE Trans. Electronic Computing, Vol. EC-8, pp. 330–334, September 1959. The CORDIC algorithm was originally developed as a digital solution for real time navigational problems. The CORDIC algorithm provides for calculation of trigonometric functions, multiplication, division and conversion binary and mixed radix number systems. The CORDIC algorithm provides an iterative method of performing vector rotations by arbitrary angles using only shifts and adds. However, the CORDIC algorithm requires the initial angle of the vector to seed the iterative algorithm. This requirement prevents the CORDIC algorithm from determining the sine and cosine of the angle in situations where only the x and y coordinates of a vector are known.

Figure 4:
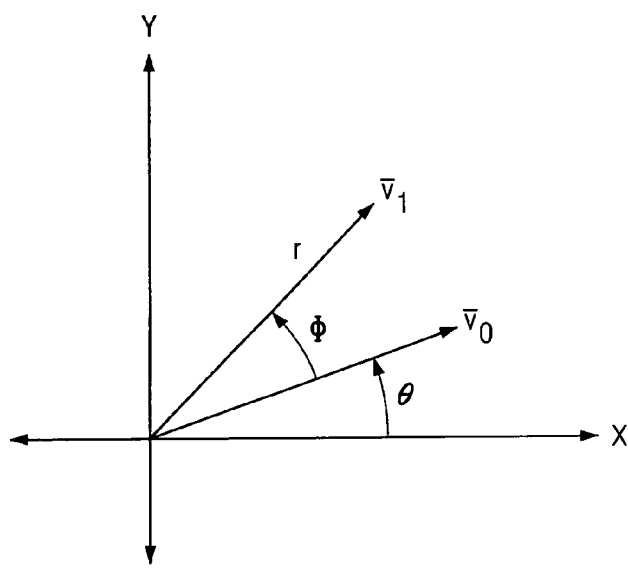
FIG. 4 illustrates successive iterations of a vector in accordance with one aspect of the present invention.

The CORDIC algorithm can be explained using coordinate transformations from vector calculus. FIG. 4 shows two vectors $\vec{v}_0$ and vector $\vec{v}_1$, that lie in the X-Y plane. If vector $\vec{v}_0$ is rotated to vector $\vec{v}_1$, the following relationships are true:

$$\vec{v}_0 = r\cos(\theta)\hat{\imath} + r\sin(\theta)\hat{\jmath}$$

$$\vec{v}_1 = r\cos(\theta+\phi)\hat{\imath} + r\sin(\theta+\phi)\hat{\jmath} \tag{3}$$

where $\hat{\imath}$ and $\hat{\jmath}$ are unit vectors in the X and Y directions. The second vector can be expressed as a function of the first vector via a rotation matrix, R, through the relationship:

$$\vec{v}_1 = R\vec{v}_0 \tag{4}$$

where:

$$R = \begin{bmatrix} \cos\phi & -\sin\phi \\ \sin\phi & \cos\phi \end{bmatrix} \tag{5}$$

Similarly, vector $\vec{v}_1$ could be rotated to a third vector $\vec{v}_2$. In general, a new vector $\vec{v}_{n+1}$ could be expressed as a function of the current vector $\vec{v}_n$ as:

$$\vec{v}_{n+1} = R_n \vec{v}_n \tag{6}$$

where the rotation matrix is defined as:

$$R_n = \begin{bmatrix} \cos\phi_n & -\sin\phi_n \\ \sin\phi_n & \cos\phi_n \end{bmatrix} \tag{7}$$

and $\phi_n$ is the incremental angle of rotation required to go from vector $\vec{v}_n$ to $\vec{v}_{n+1}$.

The rotation matrix can be expressed in a slightly different form, namely:

$$R_n = \cos\phi_n \begin{bmatrix} 1 & -\tan\phi_n \\ \tan\phi_n & 1 \end{bmatrix} = \cos\phi_n \hat{R}_n \tag{8}$$

If an entire sequence of rotations is considered, the last vector can be written as a function of the first vector as:

$$\vec{v}_{n+1} = K\hat{R}_n\hat{R}_{n-1}\ldots\hat{R}_1\hat{R}_0\vec{v}_0 \tag{9}$$

where the constant $$K = \prod_{k=0}^{n} \cos\phi_k$$

is called the aggregate constant. Since K is just a scalar, it can be absorbed into the first vector (or the last) so that Equation (9) can be written as:

$$\vec{v}_{n+1} = \hat{R}_n\hat{R}_{n-1}\ldots\hat{R}_1\hat{R}_0\vec{v}_0 \tag{10}$$

By considering the transformation that occurs for the coordinates of each vector, Equation (6) can be written as:

$$\begin{bmatrix} x_{n+1} \\ y_{n+1} \end{bmatrix} = \begin{bmatrix} 1 & -\tan\phi_n \\ \tan\phi_n & 1 \end{bmatrix} \begin{bmatrix} x_n \\ y_n \end{bmatrix} \tag{11}$$

which can be rewritten as:

$$x_{n+1} = x_n - y_n \tan\phi_n$$

$$y_{n+1} = x_n \tan\phi_n + y_n \tag{12}$$

The CORDIC algorithm defines the incremental angle of rotation as $\phi_n = \delta_n \sigma_n$, where $\delta_n$ denotes the sign of each angle and $\sigma_n$ denotes the magnitude of each angle. With this definition, Equation (12) becomes:

$$x_{n+1} = x_n - y_n \tan(\delta_n\sigma_n)$$

$$y_{n+1} = x_n \tan(\delta_n\sigma_n) + y_n \tag{13}$$

which can be simplified to:

$$x_{n+1} = x_n - y_n\delta_n \tan\sigma_n$$

$$y_{n+1} = x_n\delta_n \tan\sigma_n + y_n \tag{14}$$

due to the nature of the tangent function.

By defining the magnitude of each angle rotation as $\sigma_n = \tan^{-1}(2^{-n})$, the iterative equations become:

$$x_{n+1} = x_n - y_n\delta_n 2^{-n}$$

$$y_{n+1} = x_n\delta_n 2^{-n} + y_n \tag{15}$$

Equations (15) represent the first two equation of the CORDIC algorithm. With initial conditions of $$x_0 = \prod_{k=0}^{n} \cos\sigma_k = K$$

and $y_0=0$, it can be shown that as $n\to\infty$, then $$\sum_{n=0}^{\infty} \delta_n \sigma_n \to \phi.$$

As a result, $x_n \to \cos\phi$ and $y_n \to \sin\phi$.

The direction for each rotation is defined by $\delta_n$, the sign of each incremental angle of rotation. To determine $\delta_n$, the CORDIC algorithm uses the sign of an angle accumulator defined as:

$$z_{n+1} = z_n - \delta_n \cdot \tan^{-1}(2^{-n}) \quad (16)$$

where $\delta_n = \text{sign}(z_n)$. So, the input to the CORDIC algorithm is the angle of the first vector, $z_0$, and the outputs are the sine and cosine of this angle. As a result, the CORDIC algorithm is not very practical when the initial angle is unknown or cannot be easily computed in real time. In these situations, another approach must be taken.

In accordance with an aspect of the present invention, a modified CORDIC algorithm is provided that uses a vector, such as the offset vector, representing the angle whose sine and cosine are sought. The inputs to the modified CORDIC algorithm are the x and y coordinates defined by the offset vector and the outputs are the sine and cosine of the angle represented by the starting vector. To provide this type of operation, two vectors are actually rotated. The coordinates of the first vector are initialized like those in the CORDIC algorithm and the coordinates of the second vector are initialized with scaled values from the offset vector. The incremental rotations performed on the second vector are in a direction that is opposite to the rotations performed in the CORDIC algorithm so that the y coordinate can be driven to zero.

As a result, the modified CORDIC algorithm becomes:

$$x_{n+1} = x_n - y_n \delta_n 2^{-n}$$

$$y_{n+1} = x_n \delta_n 2^{-n} + y_n$$

$$X_{n+1} = X_n + Y_n \delta_n 2^{-n}$$

$$Y_{n+1} = -X_n \delta_n 2^{-n} + Y_n \quad (17)$$

with the following initial conditions:

$$x_0 = K$$

$$y_0 = 0$$

$$X_0 = K \cdot x$$

$$Y_0 = K \cdot y \quad (18)$$

where x and y are the coordinates defined by the offset vector. The direction for each incremental rotation then becomes $\delta_n = \text{sign}(Y_n)$. It can be shown that as $n \to \infty$, then $$\sum_{n=0}^{\infty} \delta_n \sigma_n \to \phi.$$

As a result, $x_n \to \cos\phi$, $y_n \to \sin\phi$, $X_n \to \sqrt{x^2+y^2}$ and $Y_n \to 0$.

Figure 5:
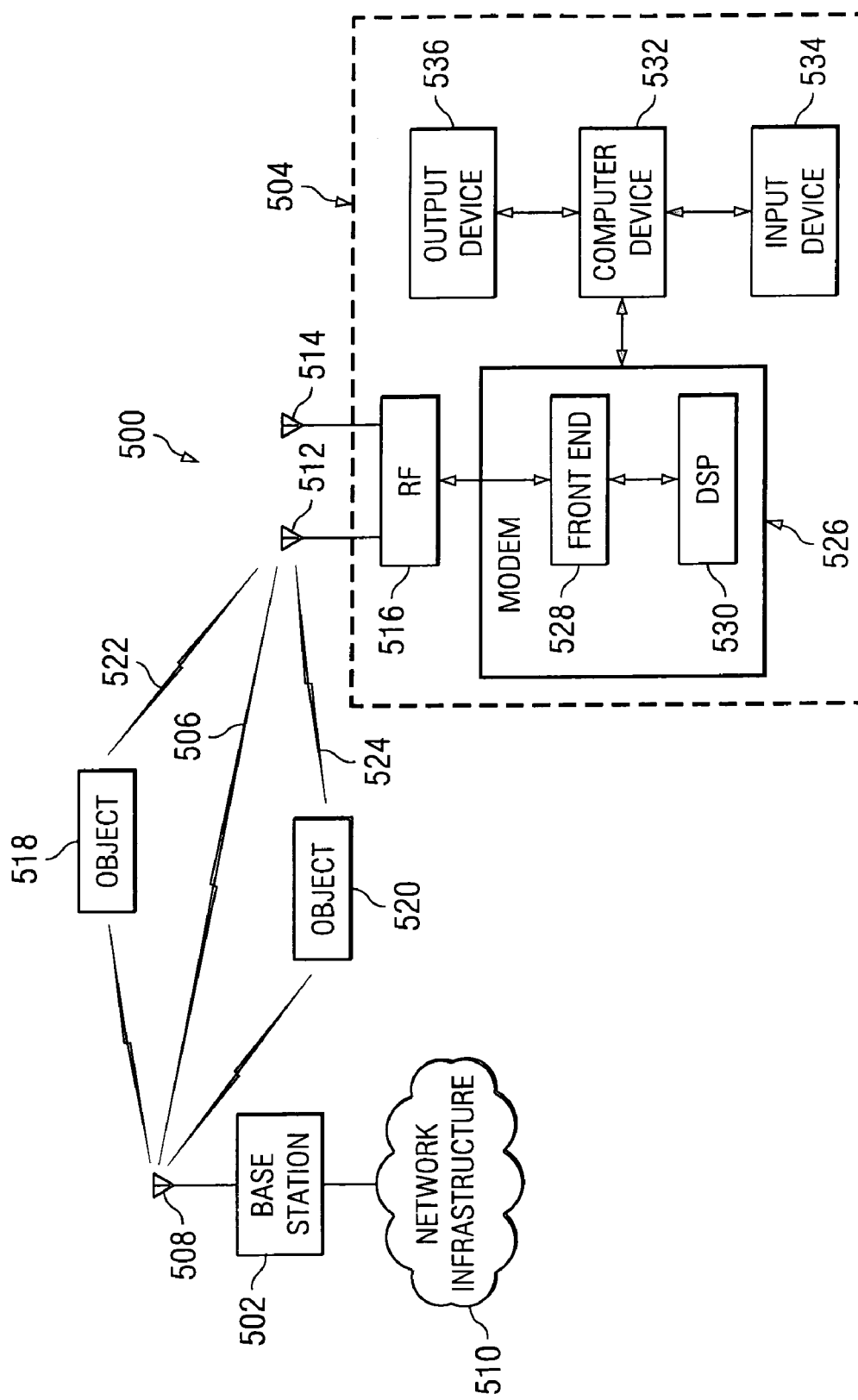
FIG. 5 illustrates a block diagram of a communications system in accordance with one aspect of the present invention.

FIG. 5 illustrates one example of a possible implementation of the present invention as it applies to a wireless communications system 500. The system includes a base station 502 and one or more subscriber units 504. The base station 502 includes a transceiver that is operative to both transmit and receive data signals 506 via an antenna system 508 (e.g., one or more antennas) wirelessly through an environment to selectively communicate information to and from the subscriber units 504. The base station 502 is coupled to a network infrastructure 510 via a server (not shown) or the like. The network infrastructure 510, for example, can include the Internet, an intranet or other type of network infrastructure. The base station 502 or its associated server (not shown) are programmed and/or configured to facilitate communication of network information relative to the network infrastructure 510 using a defined network protocol (e.g., TCP/IP, Fiber channel, etc.). The network information, for example, can include interactive video and/or audio data as well as other types of data.

For each data burst from the antenna system 508, the main data burst signal 506 is transmitted and received by one or more antennas 512 and 514 that are operatively coupled to a RF transceiver 516. The main data burst signal 506 usually reflects off one or more objects 518 and 520 in the environment, causing each of the antennas 512, 514 to receive a plurality of reflected signals 522 and 524 in addition to the main data burst signal 506. The transceiver 516 includes a receiving device that converts the received RF signals into corresponding electrical signals, which are transferred to a modem 526. The transceiver 516 also includes a transmitter coupled to the antennas 512, 514 for transmitting request data to the base station 502. It is appreciated that, while the RF transceiver 516 is illustrated as being external to the modem 526 at the subscriber unit, the transceiver could be integrated into the modem in accordance with an aspect of the present invention. Alternatively, the modem 526 could be incorporated into a set top box, an antenna, a personal computer, a hand-held computer, and/or other microprocessor-based appliance.

The modem 526 includes front end hardware and/or software 528 coupled to receive analog signals from the transceiver 516. The front end 528 is programmed and/or configured to amplify, filter and/or digitize the electrical signals corresponding to signals or bursts received at the antennas 512, 514. The front end 528, for example, is coupled to signal processor 530, which can be implemented within a DSP, an ASIC or other signal processing component 530 that is programmed and/or configured to process the digitized signal in accordance with an aspect of the present invention. That is, the signal processor 530 is operative to efficiently determine phase offsets for impulse responses.

The signal processor 530 processes the digitized signals and determines impulse responses. A current impulse response is compared with a previous impulse response or compared with an average impulse response to yield an offset vector. The offset vector represents the phase offset from the current impulse response to the previous impulse response or average impulse response. The signal processor 530 computes an offset phasor by computing the sine and cosine of the phase offset, without knowing the angle represented by the offset vector. The signal processor 530 corrects the channel impulse response by the phase offset to provide a phase corrected channel impulse response. The phase corrected channel impulse response can be converted to the frequency domain using a FFT to give channel estimates. The channel estimates and noise determinations are used by the signal processor 530 to compute constellation estimates and NSR estimates. After the constellation estimates and NSR estimates have been computed, the signal processor 530 performs slicing and decoding operations on the constellation estimates to provide a stream of data.

The modem 526 is coupled to a computer device 532, which handles additional processing steps and provides a mechanism for user interaction with the information being communicated through the communications system. The computer device 532, for example, can be a personal computer, an Internet appliance, or other microprocessor-based device operative to receive and/or send information relative to the modem 526. It is to be understood and appreciated that the modem 526 also could be integrated into the computer device 532.

The computer device 532 is coupled to an input device 534 for receiving instructions from a user directly or indirectly by a remote link. An output device 536 is also provided, so that selection information and requests can be displayed to the user. The computer device 532 can include computer-executable instructions for providing task selections, requests and control to a user and allowing a user to interact with information available over the network infrastructure 510. It will be understood and appreciated that the applicability of the present invention is not limited to a particular configuration of communication system and those skilled in the art further will appreciate many other communication implementations that can be employed in accordance with an aspect of the present invention.

Figure 6:
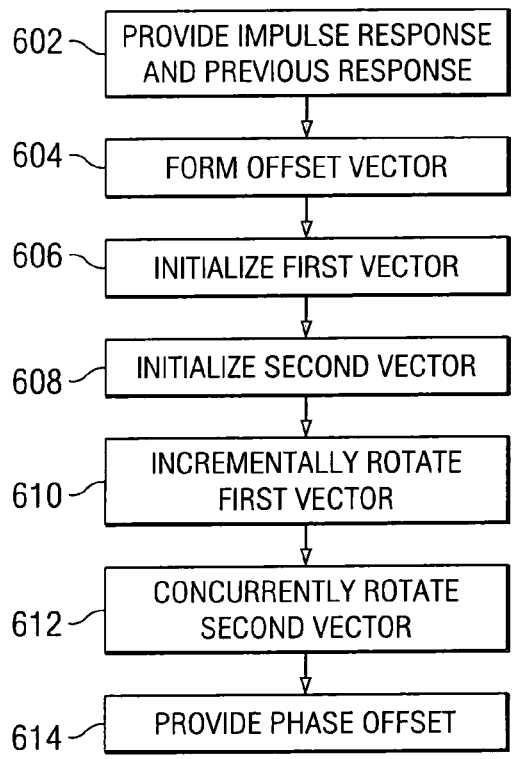
FIG. 6 illustrates a flow diagram of a methodology for computing an offset phasor in accordance with one aspect of the present invention.
Figure 7:
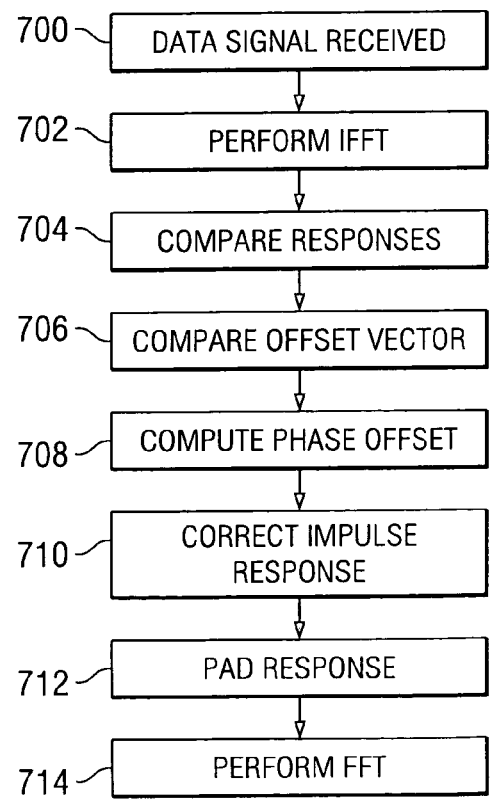
FIG. 7 illustrates a flow diagram of a methodology for processing a data signal in a communication system in accordance with one aspect of the present invention.

In view of the foregoing structural and functional features described above, a methodology in accordance with various aspects of the present invention will be better appreciated with reference to FIGS. 6–7. While, for purposes of simplicity of explanation, the methodologies of FIGS. 6–7 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 6 illustrates a flow diagram of a method of computing a phase correction for a communication system according to one aspect of the invention. A channel impulse response and a previous channel impulse response are provided at 602. An offset vector is formed as a function of the current channel impulse response and the previous channel impulse response at 604. The offset vector can be computed by multiplying the previous channel impulse response by a complex conjugate of the current channel impulse response. The offset vector has x and y coordinates. A first vector, having an x and y component, is initialized at 606, for example, according to the CORDIC algorithm. The x coordinate of the first vector is initialized to a constant and the y coordinate of the first vector is initialized to zero. A second vector, having an x and y component, is initialized according to the x and y coordinates of the input vector at 608. Incremental rotations are iteratively performed on the first vector at 610. Concurrent to performing rotations on the first vector, incremental rotations are iteratively performed, opposite to the rotations of the first vector, on the second vector until a y coordinate of the second vector is driven toward zero at 612.

The number of iterations performed concurrently on the vectors may be a specified or set number. Alternately, the number of iterations may vary where the iterations stop only when the y coordinate is about zero or close to zero. Additionally, the number of iterations may vary where the iterations stop only when the y coordinate equals zero. Generally, the greater the number of iterations performed, the greater the accuracy. An offset phasor is provided using final values of the x and y coordinates of the first vector at 614. The x and y coordinates represent the cosine and sine, respectively, of the phase offset.

FIG. 7 is a flow diagram illustrating a method of operating a communications system in accordance with one aspect of the present invention. The methodology begins at 700 where a receiver receives a data burst or data signal, digitizes the data burst and extracts tones from the data burst. The input to the channel estimation procedure is the complete set of frequency samples (tones) obtained from an initial FFT performed by the receiver. At 702, an IFFT is performed on the data burst to obtain the current channel impulse response. The IFFT can be performed on training tones extracted from the data burst. The current channel impulse response is compared to a previous channel impulse response at 704. An offset vector is computed as a result of multiplying the previous channel impulse response with a complex conjugate of the current channel impulse response at 706. A phase offset for the current impulse response is computed from the offset vector at 708. The phase offset is iteratively calculated without performing a trigonometric calculation or use of a start angle of the offset vector. The current impulse response is corrected by the phase offset at 710. The current impulse response is zero padded at 712. Frequency domain interpolation is performed at 714 by computing a FFT of the current channel impulse response. Previous interpolations may be combined with the current interpolation to form a channel estimate.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A receiver system comprising:
    a channel estimator component operative to process a data signal to form a current channel impulse response and a channel estimate;
    an offset phasor determiner that determines an offset phasor as a function of the current channel impulse response and a previous channel impulse response; and
    a phase offset corrector that corrects the current channel impulse response by the offset phasor and provides a phase corrected channel impulse response to the channel estimator, such that the channel estimator determines a corrected channel estimate, wherein the offset phasor determiner operative to store the previous channel impulse response and update the previous channel impulse response with the phase corrected channel impulse response.

2. The system of claim 1, wherein the channel estimator is operative to pad the channel impulse response with zeros before determining the channel estimate.

3. The system of claim 1, the offset phasor determiner operative to determine an offset vector as a product of the previous channel impulse response and the complex conjugate of the current channel impulse response.

4. The system of claim 3, the offset phasor being computed by iteratively rotating a pair of vectors in opposite directions.

5. The system of claim 3, the offset phasor having a first component being the cosine of the phase offset and a second component being the sine of the phase offset.

6. The system of claim 1, the channel estimate being at least partly formed from the phase corrected channel impulse response.

7. The system of claim 1, the channel estimator determines an average channel impulse response.

8. A signal processing system for use in a receiver, the system comprising:
a channel estimator that receives a digital signal and produces a current channel impulse response, an average channel impulse response and a channel estimate;
an offset phasor determiner that determines an offset phasor, the offset phasor being at least partly a function of the current channel impulse response; and
a phase offset corrector that corrects the current channel impulse response by the phase offset using the offset phasor and provides a phase corrected channel impulse response, wherein the offset phasor being at least partly a function of one or more of the average channel impulse response and a previous channel impulse response and the offset phasor determiner operative to store the previous channel impulse response and update the previous channel impulse response with the phase corrected channel impulse response.

9. The system of claim 8, wherein the channel estimator is operative to pad the channel impulse response with zeros before determining the channel estimate.

10. The system of claim 8 the offset phasor determiner storing the previous channel impulse response.

11. A system for correcting a current channel impulse response, the system comprising:
an IFFT function that receives a digital signal and produces a current channel impulse response;
an offset phasor determiner that provides an offset vector that is a function of the current channel impulse response and a previous channel impulse response, the offset phasor determiner iteratively computes the sine and cosine of the phase offset from the offset vector;
a phase offset corrector that forms a phase corrected channel impulse response from the current channel impulse response and the offset phasor; and
a FFT component, to transform the phase corrected channel impulse response into a portion of a channel estimate, wherein the phase corrected channel impulse response is padded with zeros before being transformed into the portion of the channel estimate.

12. The system of claim 11, the offset vector formed as a product of the previous channel impulse response and the complex conjugate of the current channel impulse response.

13. The system of claim 12, the sine and cosine of the phase offset iteratively computed using a first vector and a second vector.

14. A system for determining a phase corrected channel impulse response, the system comprising:
a comparator that computes an offset vector as a function of a current channel impulse response and a previous channel impulse response, the offset vector representing a phase offset of the current channel impulse response with respect to the previous channel impulse response;
a vector analyzer that computes an offset phasor as a function of the offset vector, the offset phasor having an imaginary component corresponding to the sine of the phase offset and a real component corresponding to the cosine of the phase offset; and
a phase offset corrector that computes a corrected channel impulse response using the offset phasor, wherein the phase offset corrector is further operative to update the previous channel impulse response with the corrected channel impulse response.

15. The system of claim 14, the second channel impulse response being one of an average channel impulse response and a previous channel impulse response.

16. The system of claim 14, the comparator computing the offset vector as a product of the previous channel impulse response and a complex conjugate of the current channel impulse response.

17. The system of claim 14, the offset phasor being computed without computing the angle of the offset vector.

18. The system of claim 14, the phase offset corrector correcting the current channel impulse response by the phase offset using the offset phasor.

19. A method for determining an offset phasor comprising:
providing a first channel impulse response and a second channel impulse response;
forming an offset vector as a function of the first channel impulse response and the second channel impulse response, the offset vector have a x coordinate and a y coordinate;
initializing a first vector having a x component and a y component with a constant value for the x component and with a zero value for the y component;
initializing a second vector having a x component and a y component with the x and y coordinates of the offset vector, respectively;
incrementally rotating the first vector until the y component of the second vector is about zero;
concurrent to rotating the first vector, incrementally rotating the second vector in an opposite direction of the first vector until the y component of the second vector is about zero; and
providing an offset phasor being final components of a last iteration of the first vector, the x component being the cosine of the angle formed by the offset vector and the y component being the sine of the angle formed by the offset vector.

20. The method of claim 19, the providing the first channel impulse response comprises providing a current channel impulse response.

21. The method of claim 19, the providing the second channel impulse response comprises providing one of a previous channel impulse response and an average channel impulse response.

22. The method of claim 19, the incrementally rotating the first and the second vector comprise incremental rotations capable of being preformed by a shift operation.

23. A method for correcting a channel estimate comprising:
   receiving a data burst;
   performing an IFFT on the data bursts to obtain a channel impulse response;
   comparing the current channel impulse response to a previous channel impulse response to determine an offset vector;
   computing an offset phasor from the offset vector, wherein the offset phasor is computed by;
      initializing a first vector having a x component and a y component with a constant value for the x component and a zero value for the y component;
      initializing a second vector having a x component and a y component with the x and y coordinates of the offset vector, respectively,
      concurrently incrementally rotating the first and second vectors in opposite directions until the y component of the second vector is about zero; and
      providing an offset phasor being final components of a last iteration of the first vector;
   correcting the current channel impulse response using the offset phasor to form a phase corrected channel impulse response; and
   forming a channel estimate from the phase corrected channel impulse response.

24. The method of claim 23, the forming the channel estimate comprising performing an interpolation using the phase corrected channel impulse response.

25. The method of claim 23, the computing the offset phasor comprising iteratively computing the offset phasor without performing a trigonometric calculation.

26. The method of claim 23, the computing the offset phasor comprising iteratively computing the offset phasor without use of a start angle.

* * * * *